March 26, 1940.   C. R. HUBBARD   2,194,944

ARMORED MACHINERY PACKING

Filed July 13, 1939

INVENTOR
Cecil R. Hubbard,
BY Fraser, Myers & Manley.
ATTORNEYS.

Patented Mar. 26, 1940

2,194,944

UNITED STATES PATENT OFFICE 2,194,944

ARMORED MACHINERY PACKING

Cecil R. Hubbard, Palmyra, N. Y., assignor to The Garlock Packing Company, Palmyra, N. Y., a corporation of New York Application July 13, 1939, Serial No. 284,284

3 Claims. (Cl. 288—11)

This invention relates to improvements in armored machinery packings, and is a specific variation or development of the flexible gasket disclosed and claimed in my prior patent, No. 2,066,270, of December 29, 1936. It is an object of the present invention to provide any desired part of a gasket having a plastic body portion, which is designed to be subjected to exacting conditions of service exceeding those to which other parts need be exposed, with a shield of a character such as to prevent cold flow or extrusion of the plastic material and to protect the plastic material from injury which would result from exposure to the high temperature or deleterious chemical elements of the fluid within the structure a joint of which is sealed by the gasket, without materially impairing the flexibility of the gasket and without the necessity of resorting to the tubular shield construction disclosed in my prior patent.

In the prior art will be found examples of gaskets having parts protected by shields corresponding in some respects with the one to be herein disclosed and claimed. As was explained in my prior patent, it has been proposed to make such shields of sheet lead or of canvas, or to use for such purpose a helix or coil of wire, but, as was also explained, such constructions were found to be defective in one respect or another, and the tubular construction of my prior patent was resorted to in an attempt to provide an armored gasket having the flexibility of gaskets of the prior art to which reference was made and at the same time having the greater strength necessary to satsfactorily resist cold flow or extrusion and otherwise protect the plastic element of the gasket from the exacting conditions of service to which such an article may be subjected.

It is the purpose of the present invention to provide a satisfactory shield for a gasket which will have all the meritorious properties of the one described and claimed in my prior patent, but which can be readily constructed in the form of a band of very closely braided wire comprising intermeshed strands running diagonally in opposite directions from one margin of the band to the other and turned at each margin from one diagonal direction to the other so as to form selvaged edges, the diameter, spacing, angular disposition and order of intermeshing of the strands of the braid being such that they may lie in a sufficiently close, side-by-side relation to serve as a satisfactory protector for the underlying plastic material. Such a shield has been found satisfactory as a substitute for the tubular braided construction of the invention of my prior patent.

In the accompanying drawing illustrating the preferred form of the invention herein to be disclosed and claimed, Figure 1 is a fragmentary view, partly in cross section and partly in perspective, of an armored gasket embodying the invention;

Figure 4:
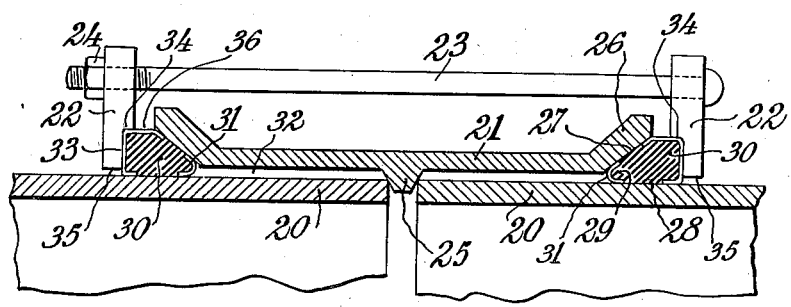
Fig. 4 is a cross-sectional view of parts of a pipe connection having joints sealed by armored gaskets each embodying the invention.

The part of a pipe connection illustrated by Fig. 4 is one example only of many mechanical constructions having joints which might be sealed by gaskets or armored packings embodying the invention to be hereinafter set forth. It comprises satisfactory means whereby a pair of pipe ends 20, 20 may be secured together by a cylindrical coupling 21, a pair of clamping rings 22, and a series of bolts and nuts, 23 and 24 respectively, whereby the clamping rings may be forcibly drawn towards each other.

The coupling 21 may preferably be provided with an inwardly directed, central, annular shoulder 25, which may serve as a stop for the opposed ends of the pipes 20, and the opposite ends of the coupling may be provided with inclined flanges 26, the inner flaring or conical walls 27 of which may cooperate with adjacent cylindrical portions 28 of the pipe ends to provide annular channels of a form adapted to receive annular wedge-like portions 29 of a pair of armored gaskets 30 embodying the invention here under consideration.

Gaskets intended for use in sealing joints of a pipe connection such as that illustrated by Fig. 4 will preferably be provided with shields 31 to protect the entering margins of the wedge-like portions 29 of the gaskets which face the joints 32 between the pipe ends and the coupling, and such gaskets may also be preferably provided with shields 33 to protect the heels or butt ends of the gaskets which make contact with the clamping rings 22.

The inner faces of the clamping rings 22 adjacent the surfaces of the pipe ends 20 may preferably be provided with annular recesses 34 to receive the outer angular portions of the butt ends of the gaskets, and the shields 33 will be so disposed as to reinforce and protect surface portions of the gaskets along the joints 35 between the clamping rings 22 and the pipe ends 20 and the joints 36 between the clamping rings 22 and the flared flanges 26 of the coupling.

Figure 1:
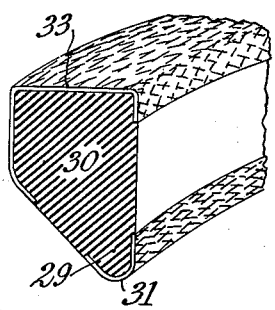
Figure 3:
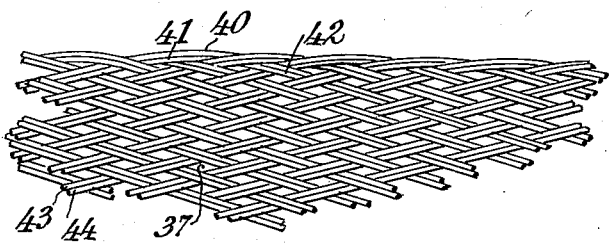
Fig. 3 is an enlarged, detail view of a fragmentary marginal portion of the braided band illustrated by Fig. 2.
Figure 2:
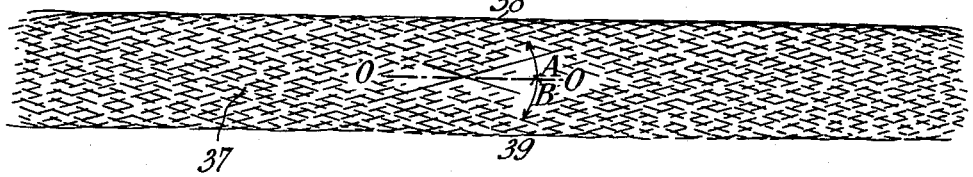
Fig. 2 is a plan view of a short length of braided material from which shields for an armored gasket embodying the invention may be constructed.

The shields 31 and 33 may be constructed in the form of a band, of suitable width, of very closely braided wire 37 (Figs. 2 and 3). Such braid may consist of intermeshed strands running diagonally in opposite directions from one margin 38 to the opposite margin 39 and be turned at each margin, as indicated at 40 (Fig. 3), from one diagonal direction, as at 41, to the other direction, as at 42, so as to form selvaged edges. In order that the strands of the braid may lie in a relatively close side-by-side relation, each may consist of two or more parallel wires 43, 44 (Fig. 3) of relatively small diameter instead of a single wire of larger diameter, and, with the same end in view, the strands, instead of being disposed at angles of 45° with respect to the longitudinal axis (O, O, Fig. 2) of the braided band, may be woven into the braid so as to run in directions making acute angles A, B, with respect to its longitudinal axis. It will be apparent that when so constructed the shields will not only be flexible but will be extremely extensible laterally so as to offer no material opposition or resistance to changes in cross-sectional form of the gaskets on which they are used, such as might prevent them from being brought into close sealing contact with the gasket-bounding surfaces of parts of the joint to be sealed.

A shield 31 for the gasket 30 made from a strip of braid such as that illustrated by Figs. 2 and 3, and of suitable width, will satisfactorily prevent cold flow or extrusion of the plastic body portion of the gasket through such shield into the joint 32 (Fig. 4) when subjected to great pressure, and will at the same time prevent highly heated fluids or injurious chemicals from gaining access to areas of the surface of the gasket underlying the shield 31 of such magnitude as to impair its effectiveness.

Likewise, a shield 33 for the gasket 30 constructed of a similar strip of braid of suitable width affords satisfactory protection against extrusion at the joints 36 and 35 (see Fig. 4) when the clamping rings 22 are drawn up tightly by the bolts 23 in order to force the gaskets 30 into the channels between the surfaces 28 and 27 of the pipe ends 20 and the coupling 21.

What has been referred to herein as the plastic body portion of the gasket 30 may be constructed of rubber composition or any other plastic or semi-plastic material of similar physical characteristics.

As will be obvious, the gasket may be constructed in the form of a continuous annular packing ring, or the gasket material may be made up in coils of stock from which lengths of proper dimensions may be so cut as to form packing rings having overlapping ends or ends which meet along diagonal planes in a manner well known in the art.

The bands 37 from which the shields 31 and 33 are constructed may be made of brass, copper, bronze, or any other material of strength sufficient to serve the intended purpose of preventing extrusion of the underlying plastic material, of protecting the plastic material from damage resulting from exposure to fluids of high temperature or fluids containing injurious chemicals, and of otherwise withstanding exacting conditions of service during shipment, storage and use to which the gasket may be subjected.

It should be apparent from the foregoing description that a gasket provided with shields constructed in accordance with the herein disclosed invention will be substantially as flexible as one made of rubber composition or similar plastic or semi-plastic material alone, thus adapting it to yield or change its form to the required degree when being assembled with pipe ends, couplings or other elements of a joint to be sealed and forced into engagement with opposing surfaces and maintained in such engagement under a desired degree of pressure.

The invention is not intended to be limited to the specific form herein selected and disclosed for purposes of illustration, but should be regarded as including variations and modifications thereof within the scope of the appended claims.

What is claimed is:—

1. An armored gasket comprising a body portion of plastic material and a flexible shield, applied to and extended along a portion of its surface including a relatively narrow zone designed to withstand exacting conditions of service exceeding those to which other parts need be subjected, the said shield comprising a band of very closely braided wire, having intermeshed strands, each consisting of a plurality of mutually contacting parallel elements running diagonally in opposite directions from one margin of the band to the other at acute angles with respect to the said margins and turned at each margin from one diagonal direction to the other so as to form selvaged edges, the diameter, spacing, angular disposition, and order of intermeshing of the strands of the braid being such that they may lie in a sufficiently close side-by-side relation to serve as a satisfactory protector for the underlying plastic material without materially impairing the flexibility and extensibility of the protected zone of the gasket.

2. An armored gasket, as defined by claim 1, of which the plastic body portion has a wedge-like part adapted to be forced into a joint between two parts to be sealed, and of which the shield is so applied as to extend along and cover the entering marginal portion of said wedge-like part and adjacent portions of its convergent surfaces with its strands disposed on the bias with respect thereto.

3. An armored gasket, as defined by claim 1, of which the plastic body portion has two relatively narrow, parallel zones each designed to withstand exacting conditions of service exceeding those to which other parts need be subjected and an intermediate zone adapted to be subjected to the pressure of a gasket-clamping element, and of which the shield is so applied as to extend along and cover the three aforesaid zones with its strands disposed on the bias with respect thereto.

CECIL R. HUBBARD.